United States Patent Office 3,745,126
Patented July 10, 1973

---

3,745,126
STABLE POSITIVELY CHARGED ALUMINA COATED SILICA SOLS
Earl P. Moore, Jr., Wilmington, Del., assignor to E. I. du Pont de Nemours and Company, Wilmington, Del.
No Drawing. Continuation-in-part of application Ser. No. 745,715, July 18, 1968. This application Apr. 22, 1971, Ser. No. 136,577
The portion of the term of the patent subsequent to Nov. 23, 1988, has been disclaimed
Int. Cl. B01j *13/00*; B44d *1/18*; C01b *33/14*
U.S. Cl. 252—313 S                                        9 Claims

ABSTRACT OF THE DISCLOSURE

Improved positively charged coated silica particles have been prepared by reacting boric acid stabilized basic aluminum acetate with a silica sol.

CROSS REFERENCE TO RELATED APPLICATION

This application is a continuation-in-part of application Ser. No. 745,715 filed July 18, 1968, now U.S. Pat. No. 3,620,978.

BACKGROUND OF THE INVENTION

Positively charged coated silica particles are known to the art as first disclosed in U.S. Pat. 3,007,878 to Alexander and Bolt. These novel positively charged coated silica particles have a variety of unique properties. However, stability has presented problems which limited their commercial manufacture.

A method has been proposed to increase the stability of these positively-charged particles as represented by U.S. Pat. 3,252,917 to Mindick & Thompson. While this patent discloses a new technique for preparing these positively charged particles it is costly and time consuming.

SUMMARY OF THE INVENTION

The stability of colloidal aquasols of positively charged colloidal particles of silica coated with aluminum dispersed in a solution containing acetate or formate counterions is improved when the aluminum is present as a borate-positively charged aluminum complex. The ratio of borate to positively charged aluminum is from 1:8 to 1:1, the ratio of positively charged aluminum to surface silica is from 0.25 to 1 to 4 to 1 and the ratio of borate to acetate or formate is from 1:12 to 4:1.

DESCRIPTION OF THE INVENTION

Aquasols of negatively charged colloidal silica particles are now readily available which may be made by a variety of processes. Typical processes for preparing these silica aquasols are those such as disclosed in Alexander and Iler U.S. 2,892,797, Bechtold and Synder U.S. Pat. 2,574,902, Rule U.S. Pat. 2,577,485 and White U.S. Pat. 2,285,477. Ordinarily, the sols are stabilized by the presence of a small amount of alkali such as sodium hydroxide and are commercially available in a variety of silica contents such as 20–40% $SiO_2$.

The silica sol used to make the positively charged aquasol of this invention can first be deionized by a single pass through a resin column containing a strong cationic exchange resin and a weak anionic exchange resin. This deionization treatment is not essential but may prove useful in preparing the positively charged coated silica particles of this invention.

The stabilized basic aluminum acetate or formate is dissolved in water to facilitate mixing with the silica sols. Generally, a 20–40% by weight stabilized basic aluminum acetate solution is sufficient for the process of this invention.

The stabilizing compounds are of the formula $$Al_4(OH)_xY_{12-x} \cdot ZH_3BO_3$$

where $x$ is 6 to 11, Y is acetate or formate and Z is ½ to 4. The most preferred compound is $$Al(OH)_2(CH_3CO_2) \cdot \tfrac{1}{3} H_3BO_3.$$

The silica sol is added to the aqueous solution of the stabilized basic aluminum acetate with vigorous agitation to insure complete mixing of the ingredients. The average colloidal silica particle size in the sol is about 5 millimicrons to 150 microns. The specific surface area of the silica sol is predetermined for instance by nitrogen absorption and enough aluminum solution is used to give a final product having a mol ratio of aluminum to surface silica groups of about 0.25:1 to 4:1 and preferably 0.5:1 to 2.5:1. It should be noted that if a silica sol prepared according to Alexander et al. U.S. 2,892,797 is used in preparing the sols of this invention, negatively charged aluminate groups may have replaced surface silica groups. For purposes of this invention the surface silica and aluminate groups are the same and the term surface silica is meant to include aluminate groups where they are substituted for silica groups. Upon stirring a clear stable sol is formed. The pH of this sol is usually about 4.2 to 5.

Concentration of the final borate-positively charged aluminum complex coated silica particles is usually between 15 through 50% solids. Preferably the solids range is about 20 to 40% by weight. These particles coated with borate-aluminum complex give excellent long term stability to precipitation of the silica or gel formation. These sols can be concentrated to greater than 50% solids. Some of the sols can be dried to yield easily redispersible particles.

Other stabilizers for the basic aluminum formate and acetate compositions may be utilized. Such stabilizers can be urea, thiourea and organic acids such as adipic and succinic acid. However, the basic aluminum formate and acetate compositions stabilized with these additional stabilizers are not readily available and the effect of other stabilizers upon the water solubility of the basic aluminum composition must be considered. Boric acid is the most preferred stabilizer.

In addition to the conventional uses for positively charged silica sols the boric acid stabilized sols of this invention are particularly useful as frictionizing agents for paper and paper products. Negatively charged silica sols have been used as frictionizing agents. The sols of this invention have a similar frictionizing effect but unlike the negatively charged silica sols can be removed from metal surfaces with remarkable facility. Thus the paper coating equipment is easily cleaned and maintained.

The following examples will better illustrate the process of the present invention.

EXAMPLE 1

A silica sol ("Ludox" SM Colloidal Silica) containing 30% $SiO_2$ by weight, the silica particles having a specific surface area of about 375 m.²/g. of $SiO_2$ as determined by nitrogen absorption is deionized with a single pass through a column containing "Dowex" 50 strong (H) resin and "Rexyn" 203 weak (OH) resin. The pH of the deionized silica sol is approximately 3.1. 400 g. of the deionized silica sol is mixed with 305 g. of a 27.7% freshly prepared solution of basic aluminum acetate ("Niaproof" $Al(OH)_2(CH_3COO) \cdot \tfrac{1}{3} H_3BO_3$) by means of a blendor. The resulting clear and stable sol contains approximately 17.0% $SiO_2$ and 4.3% $Al_2O_3$ corresponding to a mol ratio of aluminum to surface silica groups of 1:1. The pH of this sol is approximately 4.5.

EXAMPLE 2

400 g. of a silica sol ("Ludox" SM Colloidal Silica) containing 30% $SiO_2$ by weight, the silica particles having a specific surface area of about 375 m.$^2$/g. of $SiO_2$ as determined by nitrogen absorption, is mixed with 246 g. of a freshly prepared 35% basic aluminum acetate solution ("Niaproof" $Al(OH)_2(CH_3COO)\cdot\frac{1}{3}H_3BO_3$) by means of a blendor. The resulting clear and stable sol contains approximately 18.5% $SiO_2$ and 4.9% $Al_2O_3$ corresponding to a mole ratio of aluminum to surface silica groups of 1:1. The pH of this is approximately 5.0.

The pH of the above sol is adjusted with acetic acid from 5.0 to 4.6 to give increased stability.

EXAMPLE 3

A silica sol ("Ludox" HS-40 Colloidal Silica) containing 40% $SiO_2$ by weight, the silica particles having a specific surface area of about 230 m.$^2$/g. of $SiO_2$ as determined by nitrogen absorption is first deionized with a single pass through a column containing "Dowex" 50 strong (H) resin and "Rexyn" 203 weak (OH) resin. The initial pH of the deionized silica sol is approximately 3.2 but rises over a period of 18 hours to approximately pH 5.5 at which point it is redeionized with "Dowex" 50 strong (H) resin to a pH of 2.5–2.7. 400 g. of the deionized silica sol is mixed with 224 g. of the 27.7% basic aluminum acetate solution of Example 1 by means of a blendor. The resulting clear and stable sol contains approximately 25.6% $SiO_2$ and 3.5% $Al_2O_3$ corresponding to a mole ratio of aluminum to surface silica groups of 1:1. The pH of this sol is approximately 4.5.

EXAMPLE 4

200 g. of a silica sol ("Ludox" HS-40 Colloidal Silica) containing 40% $SiO_2$ by weight, the silica particles having a specific surface area of about 230 m.$^2$/g. of $SiO_2$ as determined by nitrogen absorption is mixed with 135 g. of a freshly prepared 35% basic aluminum acetate solution ("Niaproof" $Al(OH)_2(CH_3COO)\cdot\frac{1}{3}H_3BO_3$) by means of a blendor. The resulting clear and stable sol contains approximately 23.8% $SiO_2$ and 5.1% $Al_2O_3$, corresponding to a mole ratio of aluminum to surface silica groups of 3:2. The pH of the sol is approximately 4.85.

EXAMPLE 5

400 g. of a silica sol ("Ludox" LS Colloidal Silica) containing 30% $SiO_2$ by weight, the silica particles having a specific surface area of about 205 m$^2$./g. of $SiO_2$ as determined by nitrogen absorption, is mixed with 168 g. of the 27.7% basic aluminum acetate solution of Example 1, by means of a blendor. The resulting clear and stable sol contains approximately 21.1% $SiO_2$ and 2.7% $Al_2O_3$, corresponding to a mole ratio of aluminum to surface silica groups of 1:1. The pH of the sol is approximately 4.4.

EXAMPLE 6

200 g. of silica sol ("Ludox" HS-40 Colloidal Silica) containing 40% $SiO_2$ by weight, the silica particles having a specific surface area of about 230 m.$^2$/g. of $SiO_2$ as determined by nitrogen absorption is mixed with 135 g. of a freshly prepared 35% basic aluminum acetate solution by means of a blendor. The basic aluminum acetate contains 20.5% boric acid by weight and corresponds to a formula of $Al(OH)_2(CH_3COO)\cdot\frac{1}{2}H_3BO_3$. The resulting clear and stable sol contains approximately 23.8% $SiO_2$ and 5.1% $Al_2O_3$ corresponding to a mole ratio of aluminum to surface silica groups of 3:2. The pH of the sol is approximately 4.8.

EXAMPLE 7

A silica sol ("Ludox" SM Colloidal Silica) containing 30% $SiO_2$ by weight, the silica particles having a specific surface area of about 375 m.$^2$/g. of $SiO_2$ as determined by nitrogen absorption is deionized with a single pass through a column containing "Dowex" 50 strong (H) resin and "Rexyn" 203 weak (OH) resin. The pH of the deionized silica sol is approximately 3.1. 350 g. of the deionized silica sol is mixed with 328 g. of a dibasic aluminum formate solution by means of a blendor. The dibasic aluminum formate solution had an aluminum content as $Al_2O_3$ of 8.5% and corresponds to the formula $Al(OH)_2(HCO_2)\cdot\frac{1}{3}H_3BO_3$. The resulting clear and stable sol contains approximately 15.6% $SiO_2$ and 4.1% $Al_2O_3$ corresponding to a mole ratio of aluminum to surface silica groups of 1:1. The pH of this sol is approximately 4.7.

EXAMPLE 8

350 g. of a silica sol ("Ludox" LS Colloidal Silica) containing 30% $SiO_2$ by weight, the silica particles having a specific surface area of about 205 m.$^2$/g. of $SiO_2$ as determined by nitrogen absorption, is mixed with 208 g. of the dibasic aluminum formate solution of Example 7, by means of a blendor. The resulting clear and stable sol contains approximately 18.8% $SiO_2$ and 3.1% $Al_2O_3$, corresponding to a mole ratio of aluminum to surface silica groups of 1:1. The pH of the sol is approximately 4.9.

EXAMPLE 9

A silica sol ("Ludox" HS-40 Colloidal Silica) containing 40% $SiO_2$ by weight, the silica particles having a specific surface area of about 230 m.$^2$/g. of $SiO_2$ as determined by nitrogen absorption is first deionized with a single pass through a column containing "Dowex" 50 strong (H) resin and "Rexyn" 203 weak (OH) resin. The initial pH of the deionized silica sol is approximately 3.2 but rises over a period of 18 hours to approximately pH 5.5 at which point it is redeionized with "Dowex" 50 strong (H) resin to a pH of 2.5–2.7. 400 g. of the deionized silica sol is mixed with 275 g. of the dibasic aluminum formate solution of Example 7 by means of a blendor. The resulting clear and stable sol contains approximately 23.7% $SiO_2$ and 3.4% $Al_2O_3$ corresponding to a mole ratio of aluminum to surface silica groups of 1:1. The pH of this sol is approximately 4.7.

EXAMPLE 10

600 g. of a silica sol ("Ludox" AM Colloidal Silica) containing 30% $SiO_2$ by weight and 0.2% aluminate by weight calculated as $Al_2O_3$, the silica particles having a specific surface area of about 230 m.$^2$/g. of $SiO_2$ as determined by nitrogen absorption, is added to a solution of 140.4 g. "Niaproof" basic aluminum acetate, $$Al(OH)_2(CH_3COO)\tfrac{1}{3}H_3BO_3,$$

in 280.8 g. water in a blendor. The resulting clear and stable sol contains approximately 17.6% $SiO_2$ and 4.9% $Al_2O_3$, corresponding to a mole ratio of aluminum to surface silica groups of 2:1. The pH of the sol is approximately 4.70.

EXAMPLE 11

800 g. of an aluminate coated silica sol containing 27.5% $SiO_2$ by weight and 1.03% aluminate by weight calculated as $Al_2O_3$, the particles having a specific surface area of about 210 m.$^2$/g. of $SiO_2$ plus $Al_2O_3$ as determined by nitrogen absorption, is added to 380 g. 35% "Niaproof" basic aluminum acetate solution in a blendor.

The resulting clear and stable sol contains approximately 18.7% $SiO_2$ and 4.8% $Al_2O_3$. The mole ratio of positively charged aluminum to surface silica plus aluminate is approximately 3:2. The pH of the sol is about 5.0.

I claim:
1. A stable aquasol of positively charged colloidal particles of silica coated with aluminum complexed with a borate of the formula $Al_4(OH)_xY_{12-x} \cdot ZH_3BO_3$ wherein $x$ is 6 to 11, Y is acetate or formate and Z is ½ to 4, the ratio of borate to positively charged aluminum being from 1:8 to 1:1 and the ratio of positively charged aluminum to surface silica being from 0.25:1 to 4:1.
2. The aquasol of claim 1 wherein the ratio of positively charged aluminum to surface silica is from 0.5:1 to 2.5:1.
3. The aquasol of claim 1 wherein Y is acetate.
4. The aquasol of claim 2 wherein Y is acetate.
5. The aquasol of claim 4 wherein the ratio of borate to positively charged aluminum is 1:3 and the ratio of borate to acetate is 1:3.
6. The sol of claim 1 containing 15 to 50% by weight solids.
7. The sol of claim 6 containing 20 to 40% by weight solids.
8. The aquasol of claim 1 wherein Y is formate.
9. The aquasol of claim 1 wherein the borate is

$$Al(OH)_2(CH_3CO_2) \cdot \tfrac{1}{3}H_3BO_3.$$

References Cited
UNITED STATES PATENTS

| | | | |
|---|---|---|---|
| 3,620,978 | 11/1971 | Moore, Jr. | 252—313 S |
| 2,630,410 | 3/1953 | Clapsadle et al. | 252—313 S |
| 3,007,878 | 11/1961 | Alexander et al. | 252—313 S |
| 3,252,917 | 5/1966 | Mindick et al. | 252—313 S |

RICHARD D. LOVERING, Primary Examiner

U.S. Cl. X.R.

106—36, 287 S, 117—100 S; 252—313 R, 317